United States Patent [19]

Sgourakes

[11] Patent Number: 4,708,010

[45] Date of Patent: * Nov. 24, 1987

[54] APPARATUS AND METHOD FOR CALIBRATING SPAN OF PRESSURE MEASURING INSTRUMENTS

[75] Inventor: George E. Sgourakes, Millis, Mass.

[73] Assignee: The Foxboro Company, Foxboro, Mass.

[*] Notice: The portion of the term of this patent subsequent to Jan. 27, 2004 has been disclaimed.

[21] Appl. No.: 918,053

[22] Filed: Oct. 14, 1986

Related U.S. Application Data

[62] Division of Ser. No. 661,807, Oct. 17, 1984, Pat. No. 4,638,656.

[51] Int. Cl.$^4$ .............................................. G01L 27/00
[52] U.S. Cl. ......................................................... 73/4 R
[58] Field of Search ..................... 73/4 R, 4 V, 4 D; 374/143

[56] References Cited

U.S. PATENT DOCUMENTS

| | | | |
|---|---|---|---|
| Re. 31,416 | 10/1983 | Olsen et al. | 73/862.59 |
| 3,106,084 | 10/1963 | Hoffman et al. | 73/4 R |
| 3,564,923 | 2/1971 | Nudd, Jr. et al. | 73/701 |
| 4,051,712 | 10/1977 | Zias et al. | 73/4 R |
| 4,165,651 | 8/1979 | Olsen et al. | 73/704 |
| 4,165,652 | 8/1979 | Olsen et al. | 73/704 |
| 4,329,775 | 5/1982 | Olsen et al. | 73/4 R X |
| 4,348,673 | 9/1982 | Richardson | 73/DIG. 1 X |
| 4,604,891 | 8/1986 | Sgourakes et al. | 73/4 R |
| 4,638,656 | 1/1987 | Sgourakes | 73/4 R |

FOREIGN PATENT DOCUMENTS

| | | | |
|---|---|---|---|
| 830169 | 5/1981 | U.S.S.R. | 73/4 R |
| 960565 | 9/1982 | U.S.S.R. | 73/4 R |
| 970156 | 10/1982 | U.S.S.R. | 73/4 R |
| 972288 | 11/1982 | U.S.S.R. | 73/4 R |

Primary Examiner—Tom Noland
Attorney, Agent, or Firm—Parmelee, Bollinger & Bramblett

[57] ABSTRACT

A differential-pressure transmitter having a range diaphragm and a slack diaphragm to receive process pressures and to apply such pressures to an interior sealed chamber containing a fill-liquid. An internal passageway between the regions adjacent the diaphragms provides for transfer of fill-liquid in response to differential pressure changes. The passageway serially includes a vertically-oriented tube containing a ball of magnetic material and surrounded by a solenoid winding. Energization of the winding lifts the ball to the top of the tube. When the winding is de-energized, the ball drops down through the fill-liquid to create a reference pressure pluse which is directed to the range diaphragm to correspondingly alter the instrument output signal. The output signal is monitored to check the span calibration, and adjustments are made as needed.

10 Claims, 5 Drawing Figures

LOW PRESSURE PROCESS CONNECTION

HIGH PRESSURE PROCESS CONNECTION

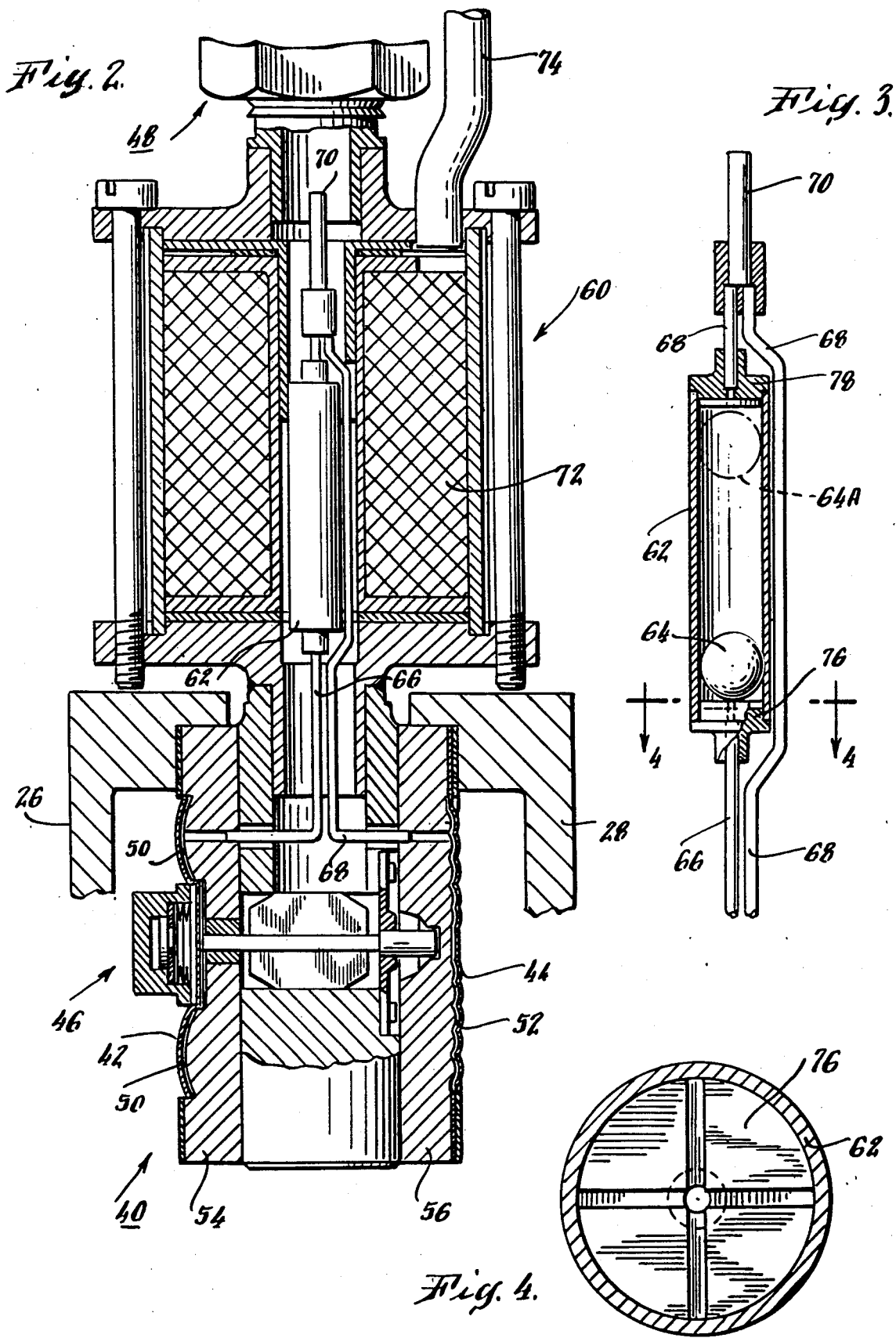

APPARATUS AND METHOD FOR CALIBRATING SPAN OF PRESSURE MEASURING INSTRUMENTS

This application is a divisional application of Ser. No. 661,807 as originally filed on Oct. 17, 1984 and now U.S. Pat. No. 4,638,656.

BACKGROUND OF THE INVENTION

1. Field of the Invention

This invention relates to apparatus for measuring fluid pressures including differential fluid pressures. More particularly, this invention relates to improvements in means for calibrating pressure measuring apparatus to assure accurate readings, and also to improvements in means for diagnosing the condition of such apparatus.

2. Description of the Prior Art

Instrumentation systems for use with industrial processes have employed apparatus of various kinds for measuring fluid pressures, especially differential pressures such as are produced across an orifice plate in a flow pipe for the purpose of developing a fluid flow-rate signal. For many years, such apparatus typically comprised a differential-pressure transmitter of the force-balance type, such as shown in U.S. Pat. No. 3,564,923. In recent years transmitters of superior have been introduced which do not employ force balance techniques. For example, U.S. Pat. No. 4,165,651 to Everett Olsen et al shows a design where a vibratable wire is tensioned in accordance with the differential pressure being measured; the frequency of vibration provides a highly accurate measure of the differential pressure. Still other devices are available commercially based on different principles, such as the use of strain-gauge IC chips for sensing applied pressures.

Pressure measuring instruments often are installed in places where they are subject to widely varying environmental conditions, such as changing ambient temperatures. Consequently, it is not uncommon for the instrument zero-set and span calibration to drift or in some way be offset, resulting in erroneous readings. Since the instruments frequently are in locations which are not readily accessible for routine maintenance, zero-set and calibration errors in many cases have not been easily correctible by operating personnel. Moreover, calibrating the span of instruments of the kinds available heretofore typically has involved relatively complex and time-consuming procedures.

Because of the importance of minimizing measurement errors, various proposals have been made for solving or ameliorating these problems. For example, remotely-operated zero-set apparatus now is available for use with differential-pressure transmitters. Such apparatus comprises a remotely-controllable pressure manifold which, upon command, blocks the low-pressure process line and by-passes the high-pressure process line to the high and low sides of the transmitter, producing a zero differential-pressure condition. If under such circumstances the transmitter output signal differs from that indicating zero differential pressure, the error is stored in memory and thereafter is used (as by means of a microprocessor) to correct the output signal when measurements are resumed.

However, such remote-set of instrument zero does not correct for errors in span calibration. Thus, in an effort to avoid the effects of such errors, differential pressure-transmitters have been designed to include one or more condition-sensing elements (such as temperature and static pressure sensors) arranged to function with associated devices to automatically adjust the transmitter output signal in response to changes in the sensed conditions. For example, the transmitter output signal may be controllably altered in accordance with a predictive algorithm stored in a microprocessor forming part of the instrument.

Although such compensator arrangements improve the accuracy of the pressure measurement, they have not satisfactorily solved the problem. In part, this is because such techniques are not capable of achieving the desired accuracy, particularly since there remain other uncompensated variables. Thus, the need for instrument recalibration from time to time is not eliminated. Moreover, such compensating arrangements are relatively costly to implement.

SUMMARY OF THE INVENTION

In accordance with a principal aspect of the invention, a pressure measuring instrument is provided with a signal-activatable device for developing a highly accurate and repeatable reference pressure to be applied to the pressure-sensing elements of the instrument. This reference pressure device in a presently preferred embodiment of the invention comprises a vertically-oriented cylindrical tube containing a fill-liquid which communicates with the fill-liquid in the instrument. A solid metal ball in the tube can be raised to the top of the tube (as by an externally-developed magnetic field) and then released. The ball drops under the force of gravity through the fill-liquid to produce a pressure pulse of essentially constant magnitude over much of the drop distance. This pressure pulse is used as a reference pressure for setting the span calibration of the instrument, as by adjusting electronic circuitry forming part of the instrument, or located remotely from the instrument.

One important advantage of the invention is that it makes possible remote calibration of the instrument. Such calibration moreover is quite accurate, and can be made while the instrument is under static process pressure.

Other objects, aspects and advantages of the invention will in part be pointed out in, and in part apparent from, the following description of preferred embodiments, considered together with the accompanying drawings.

BRIEF DESCRIPTION OF THE DRAWINGS

FIG. 2 is a vertical section through the instrument shown in FIG. 1;

FIG. 3 is a detail vertical section through the tube-and-magnetic-ball assembly shown in FIG. 2;

FIG. 4 is a cross-section view taken along line 4—4 of FIG. 3; and

DESCRIPTION OF PREFERRED EMBODIMENTS

Figure 1:
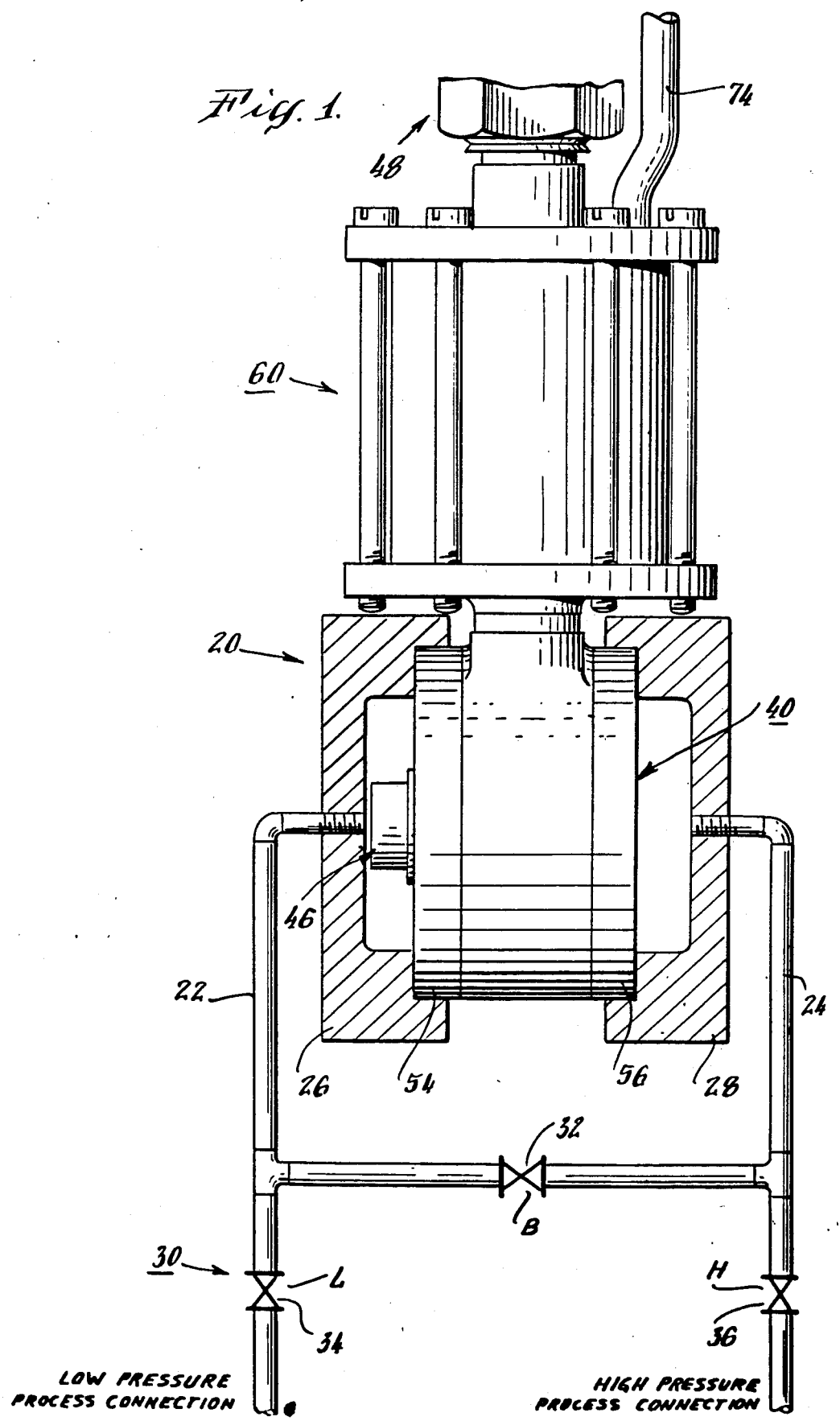
FIG. 1 is an elevation view, partly in section, showing a DP transmitter provided with span calibration means in accordance with this invention.

Referring now to FIG. 1, there is shown a differential-pressure cell generally indicated at 20, and basically similar to that shown in U.S. Pat. No. 4,165,651 mentioned hereinabove. This cell 20 is arranged to receive low and high process pressures from conduits 22 and 24 connected through the end plates 26 and 28 of the cell. A valved manifold generally indicated at 30 controls the application of these process pressures. In normal operation of the instrument, the manifold by-pass valve 32 will be closed, and the low and high pressure manifold valves 34 and 36 will be open to connect the respective conduits to the process, e.g. to the downstream and upstream sides of an orifice plate in a pipe carrying a flowing fluid.

The interior body assembly 40 of the differential-pressure cell (see also FIG. 2) comprises diaphragms 42 and 44 arranged to receive and respond to the low and high process pressures respectively. The left-hand diaphragm 42 is a so-called range diaphragm having a specific predetermined effective area. The other diaphragm 44 is a slack diaphragm having a spring rate as low as possible (ideally zero). These two diaphragms together with the associated body structure define a sealed interior pressure chamber containing a fill-liquid, e.g. a silicone oil of relatively low viscosity.

The differential pressure applied to the fill-liquid by the diaphragms 42, 44 is the input signal to the instrument, and produces a corresponding tension force on a vibratable wire assembly 46 so that the wire will vibrate at a frequency responsive to the differential pressure input signal. The vibratable wire is connected by electrical conductor means (not shown) to electronic circuitry located in an upper housing module partially shown at 48. This circuitry may be as disclosed in U.S. Pat. Re. No. 31,416, and develops a corresponding output signal suitable for transmission to a distant station. Such signal may be in the form of an alternating signal, or a direct-current signal such as in the range of 4 to 20 ma.

In the original differential-pressure cell design shown in the above mentioned U.S. Pat. No. 4,165,651, the fill-liquid regions 50 and 52 between the diaphragms 42, 44 and their back-up plates 54,56 were joined together by a common communication passageway directly connecting those two regions. As the applied differential pressure changed, some of the fill-liquid could transfer from one region to the other as the diaphragms responded to the changed pressure. In the construction shown in FIG. 2, the fill-liquid regions 50 and 52 are still in communication but now the communication passageway serially includes a reference pressure device generally indicated at 60. This device, as will be explained in detail below, is capable of producing in the fill-liquid region 50 adjacent the range diaphragm 42 an accurate and repeatable pressure pulse of constant magnitude for span calibration purposes.

This reference pressure device 60 basically comprises a vertically-oriented cylindrical tube 62 (see also FIG. 3) containing a solid dense ball 64 of magnetizable (i.e. magnetically attractive) material such as cobalt. The lower end of the tube 62 is connected by a conduit 66 to the fill-liquid region 50 adjacent the range diaphragm 42, while the top of the tube is connected by another conduit 68 to the fill-liquid region 52 adjacent the slack diaphragm 44. A fill tube 70 provides for inserting the fill-liquid.

Surrounding the tube 62 is a solenoid winding 72 adapted to be energized by an electrical current to produce in the tube a magnetic field of suffcent strength to raise the ball 64 to the top of the tube as shown at 64A. A protective conduit 74 is provided for the wires (not shown) leading to the winding.

When the winding 72 is deactivated, the ball will drop down through the fill-liquid in the tube and develop a pressure pulse which is transmitted to the fill-liquid region 50 next to the range diaphragm 42. This pulse is used for span calibration purposes, as will be described. At the bottom of the drop, the ball will come to rest on a radially-slotted end plate 76 (see also FIG. 4) arranged to prevent the ball from sealing off fill-liquid communication between the regions 50 and 52. A similar end plate 78 is at the upper end of the tube.

To carry out a calibration operation, the manifold 30 first is actuated so as to open the by-pass valve 32 and close the low and high pressure valves 34 and 36 (the valve opening and closings being sequenced in accordance with known techniques). This creates a zero differential pressure as the input signal to the instrument while capturing the process static pressure at both diaphragms 42 and 44. The instrument zero then is checked, and set if necessary, using known techniques.

The solenoid winding 72 then is energized to raise the ball 64 which, when released, descends through the fill-liquid under the force of gravity to produce the reference pressure pulse across the range diaphragm 42. The output signal of the DP transmitter is monitored during this time, and if the output signal pulse differs in magnitude from the correct value, electronic span-adjusting circuitry will be adjusted (see the Reissue Pat. No. 31,416) to fix the output at the correct value.

The pressure pulse developed by the falling-ball pressure device 60 provides a very accurate signal for calibration purposes. The resulting pressure pulse is of essentially constant magnitude for a large part of the ball movement with very high repeatability for many actuations over relatively long periods of time. The magnitude of the pressure pulse is basically unaffected by changes in viscosity, such as might be caused by temperature variations.

Although the vertical drop distance for the ball 64 is in this embodiment relatively short (e.g., 1 inch), the ball nevertheless descends sufficiently slowly to produce a pulse of substantial duration. For example, a ball of ¼" diameter may produce a constant-magnitude pressure pulse lasting approximately 20 seconds, in a fill-liquid having a viscosity of about 5 centi-stokes. Although changes in the fill-liquid viscosity, as with changes in temperature, will alter the ball drop velocity, and thus the duration of the pressure pulse, the pulse duration will in practical embodiments always be sufficient for calibration purposes.

Since viscosity is temperature dependent, the pulse duration can if desired be measured as an indication of the temperature at the instrument. Such temperature information can be used for various purposes, e.g. for process diagnostics.

An instrument using a vibratable wire as the sensing element (such as described herein) does require a relatively low viscosity fill-liquid for proper wire functioning. Other types of DP transmitters however would not be so limited, and viscosities of 100 C.S. or above might be found useful. It is important in any event that the clearance between the ball and the wall of the tube be quite small, e.g. about 0.00025 inches for a ¼" ball. It also should be noted that although the embodiment described herein employs a ball-shaped object to produce the desired pressure pulse, other objects of different shapes can be used to achieve such result, providing there is proper coordination between the cross-sectional configurations involved, and that a close fit be maintained between the object and the inner surfaces of the surrounding cavity.

Since the reference pressure device 60 utilizes the force of gravity on the ball 64 to develop the reference pressure pulse, variations in gravity at different locations on the earth will affect the magnitude of the reference pressure. Such variations could however readily be taken into account, as they are in compressible flow measurements.

Figure 5:
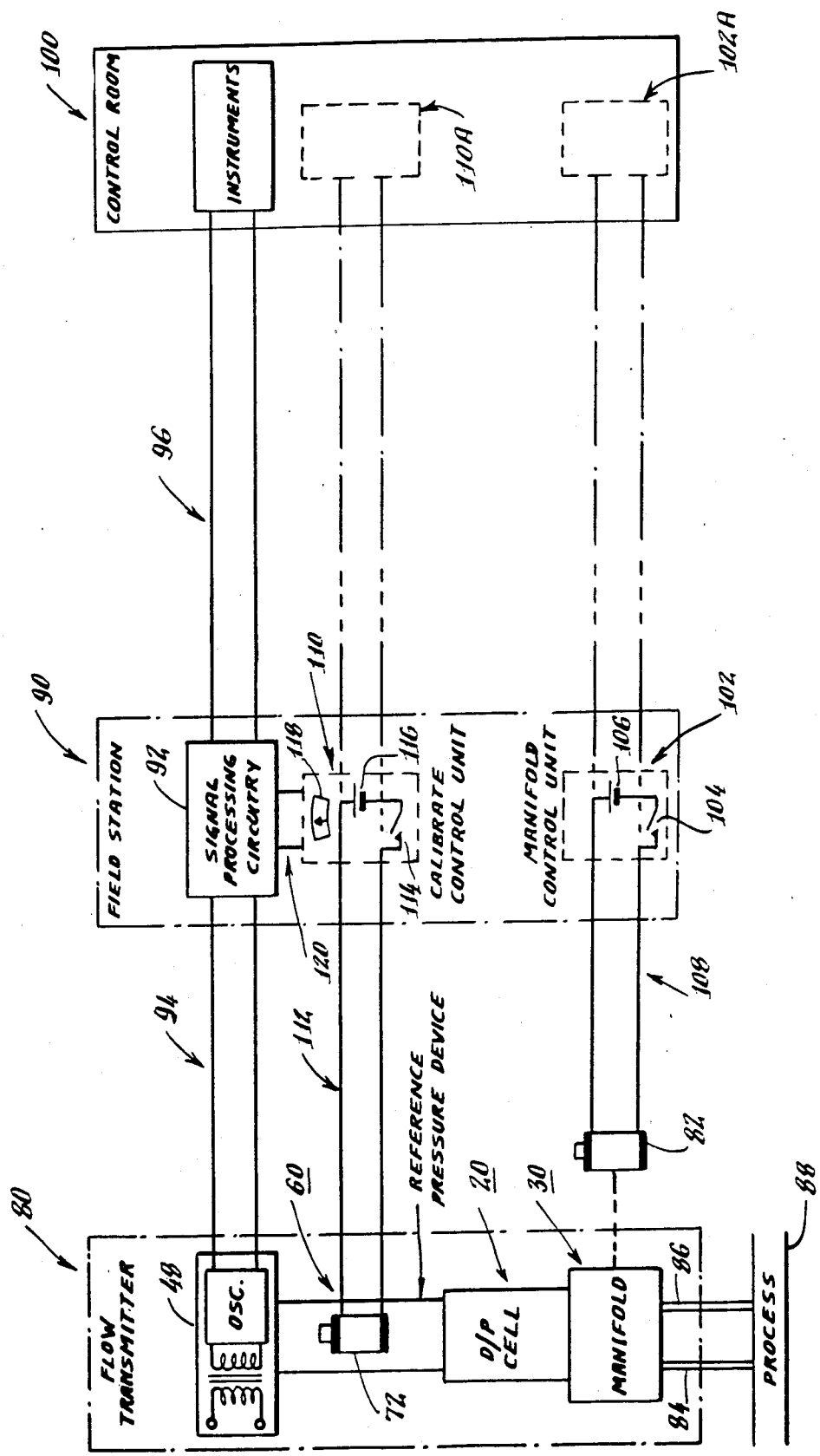
FIG. 5 is a diagram showing signal-transmitting circuitry for the DP transmitter of FIG. 1.

The present invention can be employed in various ways to enhance the operation of industrial process instrumentation systems. FIG. 5 illustrates one form of system layout. At the left is a flow transmitter generally indicated at 80, and comprising a basic DP cell 20 mounted with a manifold 30. This manifold is shown as actuatable by a remotely-controlled solenoid 82, and receives low and high pressure signals through conduits 84, 86 connected to the downstream and upstream sides of an orifice plate (not shown) in a process pipe 88 carrying a flowing fluid. Integral with the DP cell is a reference pressure device 60, as described above, including a solenoid winding 72 which is remotely energizable to carry out a span calibration. Above the reference pressure device 60 is the upper housing module 48 containing electronic circuitry operable with the vibrating wire of the DP cell 20 to produce vibration thereof at a frequency proportional to the applied differential pressure.

Shown at a distance from the flow measuring instrument 80 is a field station generally indicated at 90. This station illustratively includes signal-processing circuitry 92 connected to the instrument electronics module 48 by a two-wire line 94. Such signal-processing circuitry may for example include signal scaling and/or signal characterization circuits, as disclosed for example in U.S. Pat. No. 4,348,673 (D. A. Richardson). If the electronics module 48 does not include a frequency-to-analog converter for developing a DC output signal, the signal processing circuitry 92 can include means to perform that function. In any event, the output signal from the signal-processing circuitry, conveniently a DC signal in the range of 4–20 ma, is directed through a two-wire line 96 to a central control room 100 to operate suitable read-out and other instruments, as part of the overall control function for the complete process. It may be noted that the provision of an intermediate field station 90 may in some systems be dispensed with, and that the functions of that station could be carried out either at the transmitter location, or in the control room area 100.

The field station 90 also is shown as including a conventional manifold control unit 102 including some type of switch arrangement schematically indicated at 104 and a source of electrical power 106. This unit is connected by a two-wire line 108 which delivers power for activating the manifold 30 when it is necessary to carry out a span calibration of the DP cell 20. If a field station 90 is not included in the system, the manifold control function could be carried out at the transmitter, or in the control room area 100, as indicated at 102A.

Also included in the field station 90 is a calibrate control unit 110, which is operable after the manifold 30 has been set for a calibration operation. This control unit 110 is connected by a two-wire line 112 to the solenoid winding 72, and includes a switch arrangement schematically illustrated at 114 and a source of electrical power 116 for actuating the solenoid winding 72. As noted above, this activates the reference pressure device 60 to apply a precisely-controlled reference pressure to the DP cell 20.

The resulting output signal pulse from the electronic module 48 is monitored at the field station, as illustrated schematically by an output meter 118 connected by wires 120 to the signal processing circuitry 92 to receive the DP output signal after conditioning by the processing circuitry. If the transmitter output signal as developed at the field station is not correct, the span adjustment portion of the signal processing circuitry will be altered to assure that the output will be correct. Again, if a field station 90 is not included in the process instrumentation system, the functions of the calibrate unit 110 could be carried out at the transmitter, or in the control room area 100, as indicated at 110A.

Although three separate signal lines 94, 108 and 112 are shown in FIG. 5 for connecting the flow transmitter 80 to the field station 90, the number of such lines can be reduced by using conventional multiplexing techniques. The above-mentioned U.S. Pat. No. 4,348,673, for example, shows means for transmitting multiple signal information over a single pair of wires.

Although preferred embodiments of the invention have been described hereinabove in detail, this has been for the purpose of illustrating the principles of the invention, and should not necessarily be construed as limiting of the invention since it is apparent that those skilled in the art can make many modified arrangements based on the principles of the invention without departing from the true scope thereof.

What is claimed is:

1. In a pressure measuring instrument of the type including a sealed interior pressure chamber containing a fill-liquid and having diaphragm means to apply thereto an input pressure signal to be measured, said instrument further including sensing means responsive to the input pressure signal applied to said fill-liquid to produce a corresponding output signal;

that improvement for calibrating the span of the instrument comprising:

reference pressure means forming an integral part of said instrument and including means in communication with said fill-liquid to apply thereto a reference pressure of precisely-controlled predetermined magnitude; and said reference pressure means being activatable to apply said reference pressure to said fill-liquid so as to produce from said sensing means an output signal corresponding to said reference pressure magnitude;

whereby the span of the instrument can be monitored and adjusted as necessary to assure that the output signal will correspond exactly to said reference pressure magnitude.

2. In a pressure measuring instrument of the type including means to receive an input pressure signal and sensing means responsive to said input pressure signal to produce a corresponding output signal;

that improvement for calibrating the span of the instrument comprising:

reference pressure means forming an integral part of said instrument and including a cavity containing fill-liquid in communication with said sensing means; and means to activate said reference pressure means to develop in said fill-liquid a reference pressure of precisely-controlled predetermined magnitude so as to apply a corresponding force to said sensing means to develop therefrom an output signal corresponding to said reference pressure magnitude;

whereby the span of the instrument can be monitored and adjusted as necessary to assure that the output signal will correspond exactly to said reference pressure magnitude.

3. The method of calibrating a pressure measuring instrument of the type having pressure-responsive diaphragm means arranged to receive an input pressure signal and to seal an interior chamber containing a fill-liquid to which the input pressure signal is applied, said instrument further including sensing means responsive to the pressure signal applied to said fill-liquid for developing a corresponding output signal; said method comprising the steps of:

operating a device forming part of said instrument to apply a reference pressure signal of predetermined magnitude to said fill-liquid monitoring said output signal to determine whether it is at the correct magnitude for the applied reference pressure signal; and making such adjustment as is necessary to conform the instrument output signal to said correct magnitude upon subsequent application of said reference pressure signal.

4. In a pressure-measuring instrument of the type including means to receive an input pressure signal which is applied to a fill-liquid in an interior cavity of said instrument, said instrument further including sensing means responsive to the pressure applied to said fill-liquid to produce a corresponding output signal;

that improvement for calibrating the span of the instrument comprising:

reference pressure means in said fill-liquid; and means to activate said reference pressure means to develop in said fill-liquid a reference pressure so as to apply a force to said sensing means to produce therefrom an output signal corresponding to said reference pressure magnitude;

whereby the span of the instrument can be monitored and adjusted as necessary.

5. Apparatus as claimed in claim 4, wherein said reference pressure means comprises an object movable in said fill-liquid;

said reference pressure means being activatable to cause said object to move through said fill-liquid to develop said reference pressure in said fill-liquid.

6. The method of calibrating a pressure-measuring instrument of the type having an interior chamber containing a fill-liquid to which an input pressure signal is applied, said instrument further including sensing means responsive to the pressure applied to said fill-liquid for developing a corresponding output signal; said method comprising the steps of:

operating a device in said fill-liquid to develop a reference pressure in said fill-liquid and thereby produce a corresponding reference output signal from said sensing means;

monitoring said reference output signal to determine whether it is at the correct magnitude for the reference pressure signal; and making such adjustment as is necessary to conform the instrument output signal to said correct magnitude upon subsequent application of said reference pressure signal.

7. The method of claim 6, wherein said reference pressure signal is developed by causing an object to move through said fill-liquid.

8. Apparatus as in claim 1, wherein said reference pressure means comprises means defining a cavity containing fill-liquid in communication with said instrument fill-liquid;

means operable with said cavity to develop said reference pressure;

means to activate said reference pressure means;

said reference pressure means further comprising an element in contact with said cavity fill-liquid; and means to effect movement of said element in said cavity to create said reference pressure in said cavity fill-liquid.

9. Apparatus as in claim 2, wherein said reference pressure means further comprises an element in contact with said cavity fill-liquid; and means to effect movement of said element in said cavity to create said reference pressure in said cavity fill-liquid.

10. The method of claim 3, wherein said reference pressure signal is developed by causing an object to move in a cavity containing said fill-liquid.

* * * * *